United States Patent [19]

Assard

[11] 4,352,095
[45] Sep. 28, 1982

[54] A/D DYNAMIC RANGE ENHANCING TECHNIQUE

[75] Inventor: Gerald L. Assard, Waterford, Conn.

[73] Assignee: The United States of America as represented by the Secretary of the Navy, Washington, D.C.

[21] Appl. No.: 277,298

[22] Filed: Jun. 25, 1981

[51] Int. Cl.³ .............................................. H03K 13/24
[52] U.S. Cl. ................................. 340/347 DD; 375/17
[58] Field of Search ................... 340/347 DD; 375/17, 375/18, 19, 20; 371/56

[56] References Cited

U.S. PATENT DOCUMENTS

| | | | |
|---|---|---|---|
| 2,700,696 | 1/1955 | Barker | 375/17 |
| 4,003,041 | 1/1977 | van Duuren | 375/19 |
| 4,087,642 | 5/1978 | Jessop | 375/17 |

Primary Examiner—C. D. Miller
Attorney, Agent, or Firm—Robert F. Beers; Arthur A. McGill

[57] ABSTRACT

A system for increasing the dynamic range of a digital device. This is accomplished by enhancing a serial N bit Bipolar Return to Zero (BPRZ) transmitter so as to employ an inherently hidden degree of freedom. This enables the receiver to extract N+1 bits of digital code from an N bit transmitted code.

2 Claims, 7 Drawing Figures

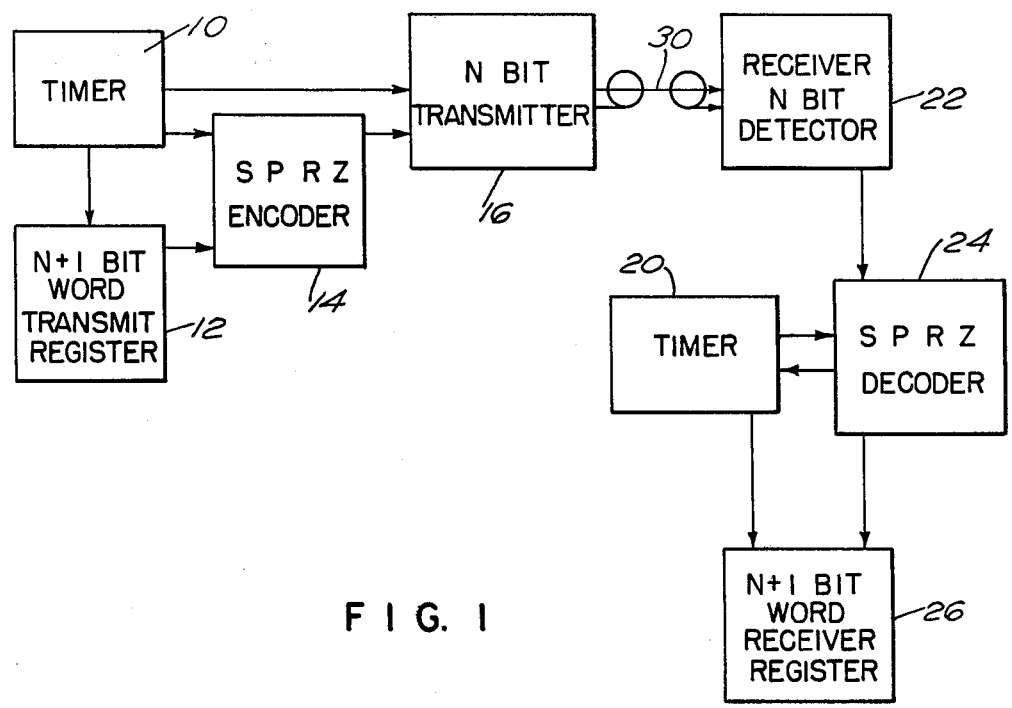
FIG. 1
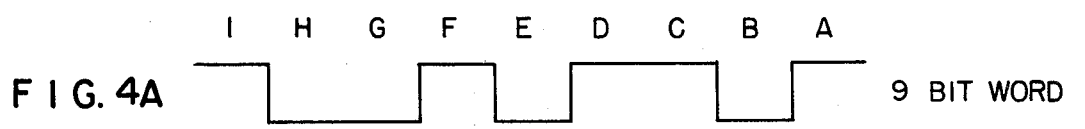
FIG. 4A — 9 BIT WORD
FIG. 4B — 8 BIT WORD
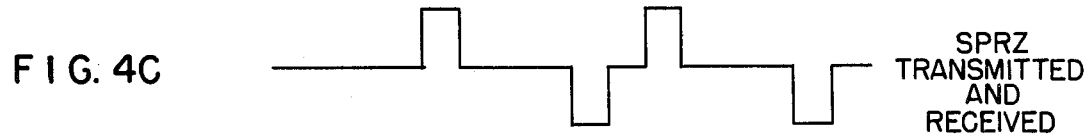
FIG. 4C — SPRZ TRANSMITTED AND RECEIVED
FIG. 4D — DECODED 9 BIT WORD

A/D DYNAMIC RANGE ENHANCING TECHNIQUE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Bipolar Return to Zero transmitting and receiving codes have been employed for a number of years. These transmitting schemes in many cases normally employ word formats consisting of 4, 8, 12 or 16 bits. One such system, the Companding Analog to Digital Converter employs the following BPRZ 8 bit code:

$$S\ E_2\ E_1\ E_0\ M_3\ M_2\ M_1\ M_0$$

wherein S designates the sign ±, $E_n$ the exponent and $M_n$ the mantissa.

SUMMARY OF THE INVENTION

It became necessary to increase the dynamic range of the A/D conversion and there was no additional space to carry a needed additional bit for the exponent. Therefore, Sign Polar Return to Zero (SPRZ) was invented. This system maintains an 8 cell ternary code signal in the transmitter but develops a 9 bit binary code signal in the receiver. Hence the transmitter is presented with the following SPRZ 8 cell ternary code signal.

$$E_3\ E_2\ E_1\ E_0\ M_3\ M_2\ M_1\ M_0$$

while the receiver decodes the following 9 bit binary code signal:

$$S\ E_3\ E_2\ E_1\ E_0\ M_3\ M_2\ M_1\ M_0$$

BRIEF DESCRIPTION OF THE DRAWINGS

FIG. 1 is a block diagram of the range expansion system in accordance with the present invention;

FIG. 4A shows the original 9 bit binary word;

FIG. 4B shows the Ith bit removed from the original 9 bit word;

FIG. 4C shows the transmitted and received ternary code signal; and

FIG. 4D shows the decoded 9 bit binary word.

DESCRIPTION OF THE PREFERRED EMBODIMENT

Figure 2:
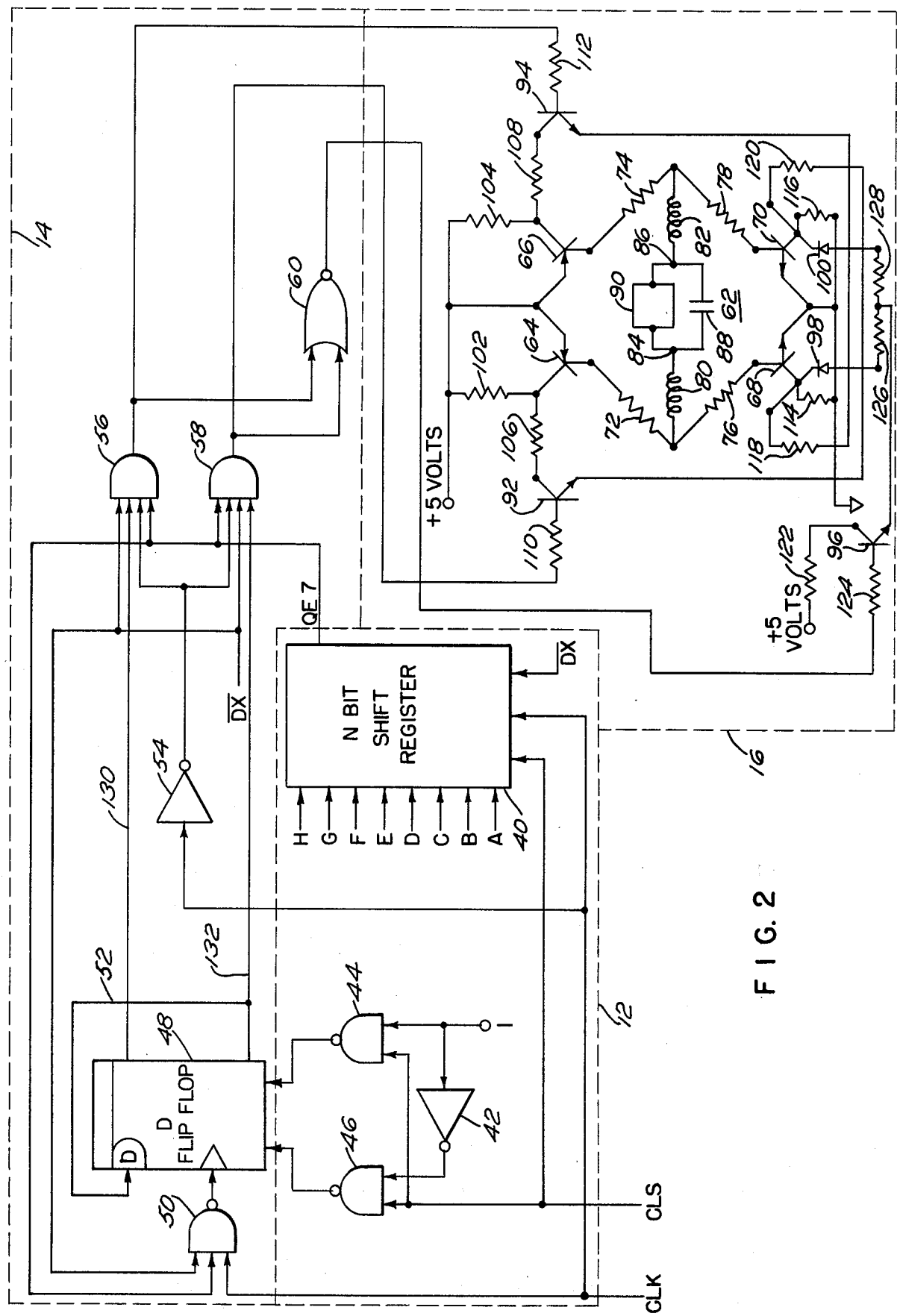
FIG. 2 is a detailed diagram of the transmitting portion of FIG. 1.

FIG. 1 is a block diagram showing the building blocks required to transform an N+1 bit binary word in an N cell ternary format that can be reconstructed into the original N+1 bit binary word at the receiver. A first timer 10 sends timing pulses to the N+1 bit binary word transmit register 12, the SPRZ encoder 14 and the N cell ternary signal transmitter 16. A second timer 20 receives synchronization from receiver N ternary signal detector 22 through SPRZ decoder 24 and provides timing pulses for the SPRZ decoder 24 and the receiver register N+1 binary bit word 26. Table 1 shows the binary and ternary word information that is available in the blocks of FIG. 1.

TABLE 1

| | | | 9 slot word | | | | | | Can be seen at block or blocks | Remarks |
|---|---|---|---|---|---|---|---|---|---|---|
| I | H | G | F | E | D | C | B | A | | |
| 1 | 0 | 0 | 1 | 0 | 1 | 1 | 0 | 1 | 12 | |
|   | 0 | 0 | + | 0 | − | + | 0 | − | 16, 22 and 24 | Slot I does not appear. |
| 1 | 0 | 0 | 1 | 0 | 1 | 1 | 0 | 1 | 26 | |
| 0 | 0 | 1 | 1 | 0 | 1 | 1 | 0 | 1 | 12 | |
|   | 0 | − | + | 0 | − | + | 0 | − | 16, 22 and 24 | Slot I does not appear. |
| 0 | 0 | 1 | 1 | 0 | 1 | 1 | 0 | 1 | 26 | |

With reference to the top half of Table 1, the N+1 binary bit word transmit register 12 sends the coded word 1 0 0 1 0 1 1 0 1 to the SPRZ encoder 14 in response to timing signals from timer 10. The SPRZ encoder 14 omits the first slot which in this case has a binary bit 1 under the letter I. All other slots having 1 binary bits are alternately polarized + and − starting with a + polarization under the letter F. This + polarization is a signal that the omitted first slot has a binary bit of 1.

In the bottom half of Table 1 the N+1 binary bit word transmit register 12 sends the coded word 0 0 1 1 0 1 1 0 1 to the SPRZ encoder 14 in response to timing signals from timer 10. The SPRZ encoder 14 omits the first slot which in this case is a binary bit 0 under the letter I. All slots having 1 binary bits are then alternately polarized − and + starting with a − polarization under the letter G. This − polarization is a signal that the omitted first slot has a binary bit of 0.

In both of the above cases the SPRZ encoder 14 polarizes the bit stream to a ternary code so that the first 1 bit transmitted contains two pieces of binary information. First, its own bit identity and second the identity of the missing bit. A + polarization indicates its own identity is 1 and the missing binary bit is a 1. A − polarization indicates its own identity is 1 and the missing bit is a 0. The SPRZ encoder 14 then alternates the polarization of the remaining 1 bits of the word to present what appears to be a conventional Bipolar Return to Zero format. The N ternary signal transmitter 16 is a conventional BPRZ transmitter that receives signals from SPRZ encoder 14 and transmits the signal to the receiver N ternary signal detector 22 over transmission line 30 in synchronization with timer 10. The ternary signals are extracted from the transmission line 30 at the receiver N ternary signal detector 22. The detector 22 provides the receiver timer 20 with the conventional synchronizing pulses through SPRZ decoder 24 to maintain synchronism with the transmitted ternary signal stream. A second function of the detector 22 is to present the SPRZ decoder 24 with the polarity of the first nonzero encoded signal along with the transmitted N signal serial word. The polarity of the first nonzero encoded signal is processed within the SPRZ decoder 24 to identify the missing binary bit and to reconstruct the original N+1 binary bit word. While the word is being decoded by SPRZ decoder 24, the word is being clocked by timer 20 into the N+1 binary bit word receiver register 26. The word is then transferred to external circuitry and the register 26 is cleared for accepting the next word. The SPRZ decoder 24 must also provide for decoding the Ith bit for the case when no nonzero signals are transmitted, as for example A through H all zero. This can be accomplished for only one state of the Ith bit, whereas the complement of the Ith state with A through H all zeroes must become a forbidden transmitted word. That is the receiver must automatically present the chosen Ith state whenever it is presented with the A through H all zero.

FIG. 2 shows a more detailed diagram of N ternary signal transmitter 16.

The transmit register 12 is comprised of an N binary bit shift register 40 that stores A through H upon load command CLS. Transmit register 12 also receives the Ith bit that enters register 12 through inverter 42 and one of the NAND gates 44 and 46.

The encoder 14 is comprised of a D flip-flop 48 that receives the Ith binary bit from one of two terminals depending on the value of the Ith binary bit. D flip-flop 48 is also connected at an input terminal to NAND gate 50. In addition there is a feedback line 52. Encoder 14 also includes inverter 54, NAND gates 56 and 58, and NOR gate 60. A data transfer signal $\overline{DX}$ is supplied to NAND gates 50, 56 and 58.

N ternary signal transmitter 16 is comprised of a bridge circuit 62 that has interconnecting transistors 64, 66, 68 and 70, resistors 72, 74, 76 and 78, inductances 80 and 82, output terminals 84 and 86, and capacitor 88. The transmitter 16 supplies a signal to load across its output terminals 84 and 86. Additional components included in transmitter 16 are transistors 92, 94 and 96, diodes 98 and 100, and resistors 102, 104, 106, 108, 110, 112, 114, 116, 118, 120, 122, 124, 126 and 128.

Figure 3:
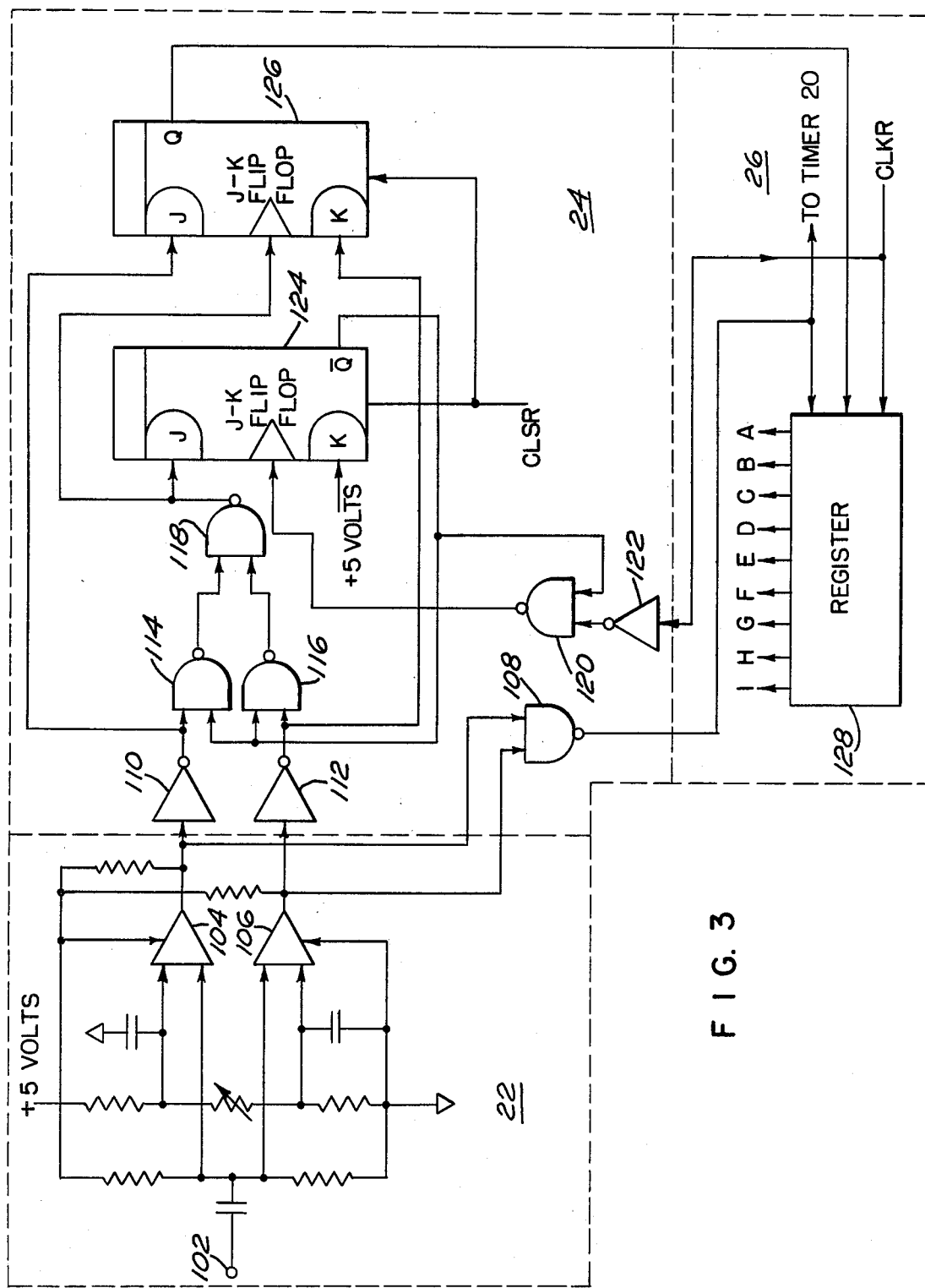
FIG. 3 is a detailed diagram of the receiving portion of FIG. 1.

FIG. 3 shows a more detailed diagram of receiver N ternary signal detector 22, SPRZ decoder 24 and N+1 binary bit word receiver register 26. The receiver N ternary signal detector 22 is comprised of input terminal 102, threshold detectors 104 and 106 and various circuit components. The SPRZ decoder 24 receives inputs from both threshold detectors 104 and 106 at NAND gate 108 and at respective inverters 110 and 112. Additional components within decoder 24 are NAND gates 114, 116, 118 and 120, inverter 122, and J-K flip-flops 124 and 126. The N+1 binary bit word receiver register 26 is comprised of an N+1 binary bit shift register 128 having various inputs and N+1 binary bit outputs.

FIG. 4A shows the nine binary bit word at the top of Table 1. FIG. 4B shows the eight binary bit word present in N binary bit shift register 40. FIG. 4C shows the ternary signal that is transmitted and received. FIG. 4D shows the reconstructed nine binary bit word available in register 128.

The operation of the transmitting portion of the system is now described using the 9 bit binary word at the top of Table 1. The Ith binary bit being HIGH passes through NAND gate 44 to preset command on D flip-flop 48 upon load command CLS. This places a HIGH signal on line 130 and a LOW signal on line 132.

The circuitry inhibits any output of terminals 84 and 86 at this time due to the first bit H being a zero. AND gates 56 and 58 have a LOW output which in turn gives NOR gate 60 a a HIGH output. This causes transistor 96 to conduct turning on transistors 68 and 70 effectively shorting out the load across contacts 86 and 84. This condition continues to exist until F is presented to gates 56 and 58. Gate 54 conducts when the clock CLK returns to zero thereby placing a HIGH signal through inverter 54 onto AND gates 56 and 58. The F is HIGH and the data transfer $\overline{DX}$ is HIGH. Line 130 presents a HIGH signal from flip-flop 48 to AND gate 56. This causes gate 60 to receive a HIGH signal from gate 56 and to go LOW shutting down transistor 96. This inhibits transistors 68 and 70 removing the short circuit across terminals 86 and 88. A second path for gate 56 is to transistor 94 which causes transistors 94, 66 and 68 to conduct. This provides a current path through terminal 86, the load 90 and terminal 84 via +5 volts, transistor 66, resistor 74, inductors 82 and 80, resistor 76 and transistor 68 to ground presenting the positive return to zero pulse. Its return to zero is due to the clock period. In addition D register 48 flips due to feedback to register 48 on line 52.

When E is presented the operation is the same as for H. D is then transmitted from register 40. Gate 58 conducts and gate 56 is inhibited. This causes gate 60 to go LOW and it removes the short circuit across the load 90 as explained above. In this case gate 58 conducting cuases transistors 92, 64 and 70 to conduct giving a current path through transistor 64, resistor 72, inductor 80, terminal 84, load 90, terminal 86, inductor 82, resistor 78 and transistor 70 to ground. This passes current through the load in the opposite direction as the F pulse. Following the above procedures C, B and A are transmitted to complete the sequence.

The receiver 22 input terminal 102 receives the signal shown in FIG. 4C. Threshold inverter detectors 104 and 106 present the structure of respective positive and negative pulses in FIG. 4C through inverter 110, NAND gate 114 and NAND gate 118 to J-K flip-flops 124 and 126, or through inverter 112, NAND gate 116 and NAND gate 118 to J-K flip-flop 124. A direct line goes from the output of inverter 110 to the J input of flip-flop 126 and from the output of inverter 112 to the K input of flip-flop 126. This decodes the Ith binary bit. For example, the H and G signals which are zero level are first received and fail to change the state of either threshold detector 104 or 106 which continue to present HIGH level signals to NAND gate 108. NAND gate 108 presents a LOW level signals to register 128 and this is stored into registers H and G upon receipt of CLKR pulses. When the positive pulse F is received it changes the state of threshold detector 104 to a LOW level causing the output of NAND gate 108 to become HIGH which is clocked into and stored in register 128. In addition the detected pulse F passes through 110, 114 and 118 to set the holding J-K flip-flop 124 and clocks the HIGH level signal from 110 into the Ith bit output of register 128 through flip-flop 126. J-K holding flip-flop 124 has been set due to the detection of the first nonzero bit and remains in this state until the reception of the CLSR pulse which precedes the next word. This holds the Ith bit J-K flip-flop 126 in its present detected state. The remaining binary bits are then received and stored by register 128 through NAND gate 108. Prior to a new word register 128 must be read out.

If the signal F had been negative going instead of the positive signal received then the path of the signal detection would have been through 102, 106, 112, 116, 118, 124 and 126, and from 112 to 126 which would have presented a low level to register 128 for the Ith binary bit.

There has therefore been described a Sign Polar Return to Zero digital formatter system that employs an inherent hidden degree of freedom of the serial N binary bit Bipolar Return to Zero Transmitter. The receiving system extracts N+1 binary bits of digital code from an N ternary signal transmitted code.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An analog to digital range enhancer comprising:

encoding means for changing an N+1 binary bit word to an N ternary word without loss of information and for transmitting said N ternary word, said encoding means comprises an N+1 binary bit word transmit register having an N binary bit shift register and a one binary bit source, a sign polar return to zero encoder having separate inputs for receiving signals from said N binary bit shift register and said one binary bit source and having a plurality of output terminals, and transmitting means connected to said sign polar return to zero output terminals for generating and transmitting said N ternary word, said transmitting means comprises a bridge circuit including a plurality of switching devices; and decoding means for receiving said N ternary word and for reconstructing said N+1 binary bit word from said N ternary word.

2. An analog to digital dynamic range enhancer according to claim 1 wherein said decoding means further comprises:

a receiver for receiving said N ternary word and for providing a plurality of outputs;

an encoder connected to receive said plurality of outputs from said receiver and providing a first output with said N binary bit word and a second one binary bit output; and a shift register for storing and making available said N+1 binary bit word.

* * * * *